April 5, 1960
J. B. OTTESTAD
2,931,218
CONTROLLED ACTUATOR
Filed May 23, 1957
2 Sheets-Sheet 1
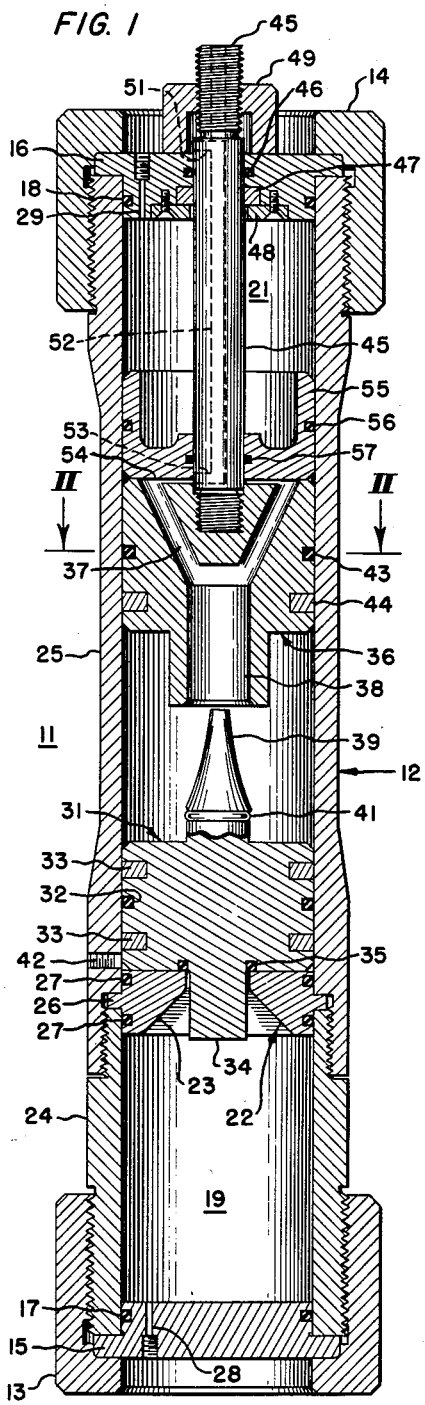
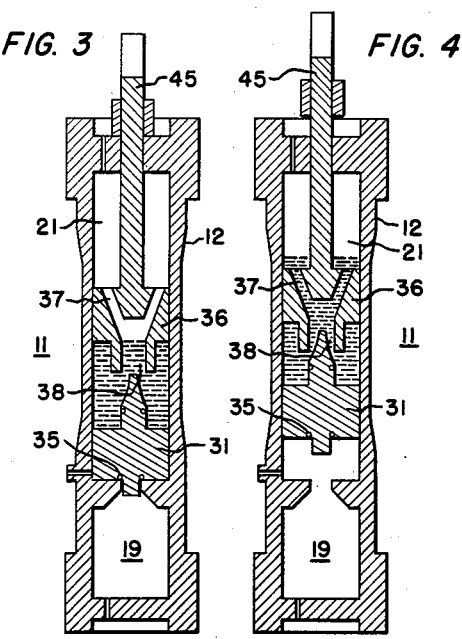
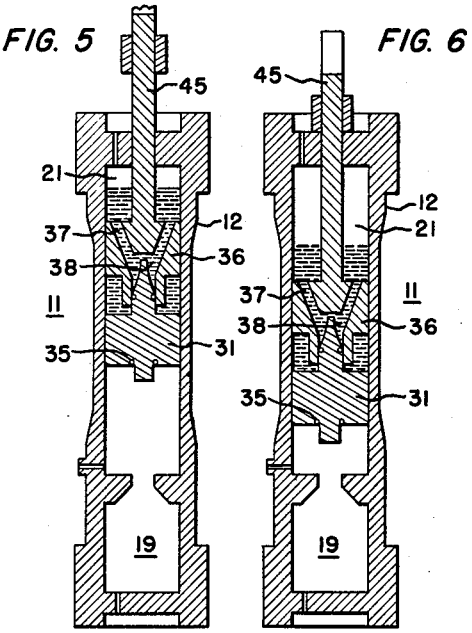
INVENTOR.
JACK B. OTTESTAD
BY
*Walter J. Jason*
ATTORNEY

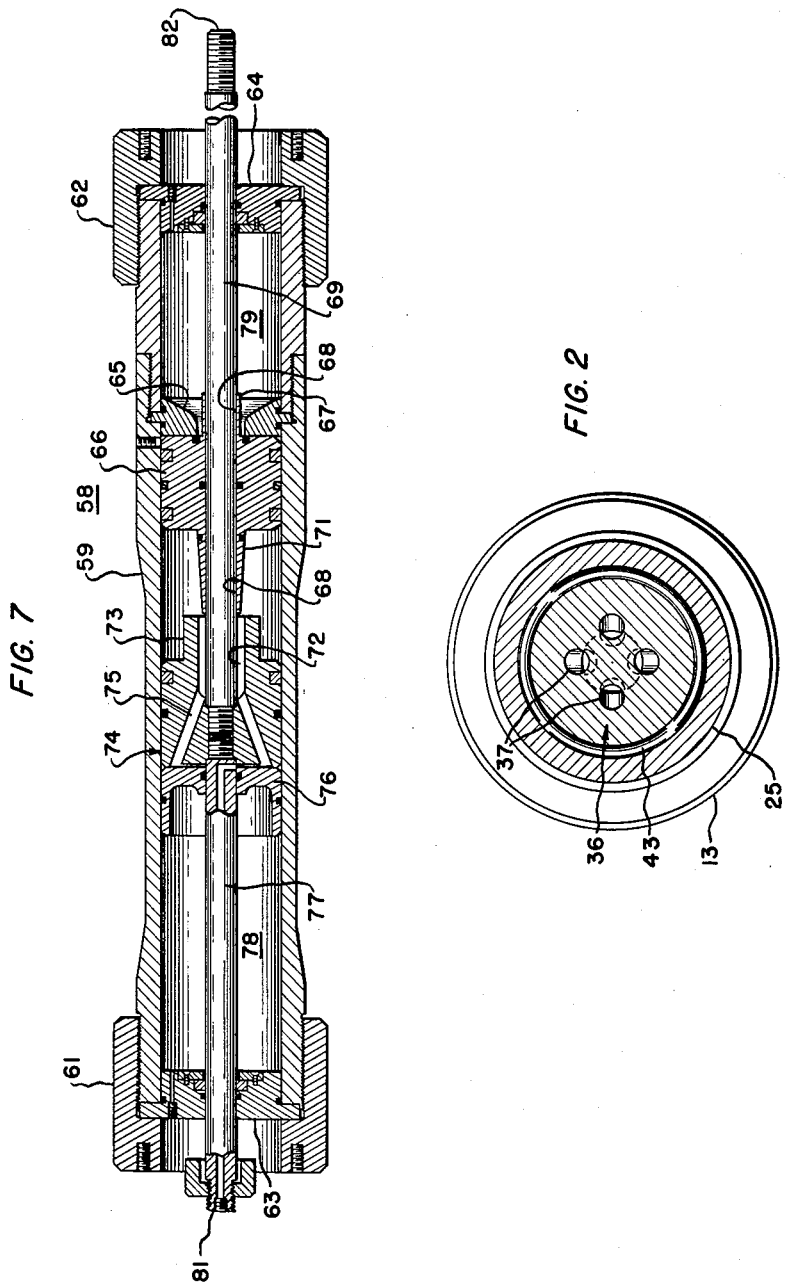
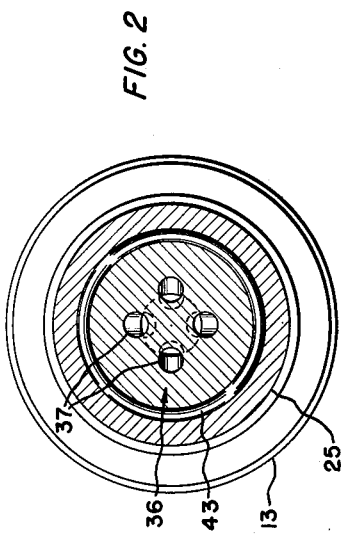

United States Patent Office 2,931,218
Patented Apr. 5, 1960

2,931,218

CONTROLLED ACTUATOR

Jack B. Ottestad, Claremont, Calif., assignor to General Dynamics Corporation, San Diego, Calif., a corporation of Delaware Application May 23, 1957, Serial No. 661,166

14 Claims. (Cl. 73—12)

The present invention relates in general to actuators and actuating apparatus for producing controlled thrust loads, and in particular relates to an actuator for producing controlled thrust-time patterns independently of any displacement of the element or workpiece against which the thrust loads are applied.

The efficient storage and rapid release of energy is a highly desirable characteristic of satisfactory actuators and actuating apparatus, and various means for accomplishing such storage and release of energy have been proposed by the prior art. One such means is described in detail in my copending patent application Serial No. 617,014, filed October 19, 1956. Such means relate to an actuator apparatus which depends upon a preliminary accumulation or storage of pressure energy, and a subsequent sudden release or triggering of that pressure energy to drive a thrust column or the like through a work stroke. The resistance to displacement of the thrust column, which may be imposed by a workpiece or component to be tested, greatly affects the force-time pattern exerted by the actuator, and this is sometimes not a desirable characteristic. For example, a certain initial displacement of the thrust column is necessary to overebalance or trigger the actuator of the aforesaid patent application, and if a specimen which is comparatively unyieldable is being acted upon by the thrust column, the actuator will not be triggered.

Accordingly, the apparatus of the present invention is operative to store energy and rapidly release it in a manner productive of high and controlled thrust loads, and independently of the displacement or lack of displacement of the thrust column. The stored pressure energy acts upon a load piston, which is not mechanically coupled to the thrust column, the displacement of the piston therefore being independent of the displacement of the thrust column. The force exerted against the load piston is transmitted to a second piston securely coupled to the thrust column, and a fluid medium disposed between the two pistons effects a transfer of thrust loads. This fluid medium is metered out of the space between the two pistons in a manner controlling the magnitude of transfer of thrust loads from one piston to the other whereby a predetermined force-time pattern may be imposed upon the second piston regardless of the extent of displacement of such second piston. The load piston merely follows the second piston during any displacement of the latter, and continues to apply the thrust load dictated by the controlled bleeding of the fluid medium from between the two pistons.

It is therefore an object of the present invention to provide an improved actuator for generating a predetermined force-time pattern, and which is characterized by an initial accumulation of pressure energy followed by a sudden, controlled release of such energy.

Another object of the invention is the provision of a unique actuator characterized by the substantially instantaneous release of stored energy to produce predetermined force-time thrust loads substantially independently of the displacement effected by such thrust loads.

A further object of the invention is to provide an improved actuator for generating a force-time pattern which may be predetermined to establish the character and energy level of the thrust loads imposed upon a test coupon, workpiece, or the like.

Another object of the invention is the provision of a novel actuator which is adapted to rapidly impart energy to a thrust column according to a predetermined force-time pattern, unaffected by the displacement or lack of displacement of such thrust column.

Still another object of the invention is to provide an improved actuator, of the type characterized by storage and sudden release of pressure energy, which includes fluid metering means for adjusting the pattern of transfer of such pressure energy to a workpiece, test element, or the like.

Another object of the invention is the provision of an improved actuator which is adapted to store and rapidly release energy in accordance with a predetermined force-time pattern, and which is simple to manufacture, easy to maintain, and uncomplicated in operation.

Other objects and features of the present invention will be readily apparent to those skilled in the art from the following specification and appended drawings wherein are illustrated certain preferred forms of the invention, and in which:

Figure 1 is a longitudinal cross sectional view of one embodiment of the present invention;

Figure 2 is a sectional view taken along line II—II of Figure 1;

Figures 3 through 6 are diagrammatic views of the embodiment of Figures 1 and 2, illustrating various stages of operation of such embodiment; and Figure 7 is a longitudinal cross sectional view of another embodiment of the present invention.

Referring to the drawings and more particularly to Figures 1 and 2, there is illustrated an embodiment of the actuator of the present invention which is generally designated 11, and which is particularly adapted for producing rapidly applied thrust loads in a predetermined force-time pattern. This actuator 11 comprises, generally, an elongated pressure vessel or cylinder 12 which is threaded at its ends to carry a pair of end caps 13 and 14, both of which are centrally apertured as illustrated. Located within the ends of cylinder 12 are a pair of end plates 15 and 16 whose edge margins are located between and bear against suitable inner shoulders of end caps 13 and 14 and the ends of cylinder 12, respectively, whereby end plates 15 and 16 are rigidly secured in the positions illustrated when end caps 13 and 14 are threaded upon cylinder 12. Sealed, fluid-tight relationship between cylinder 12 and end plates 15 and 16 is afforded by the provision of usual O rings 17 and 18 carried within peripheral grooves of plates 15 and 16. As will be seen, end plate 16 is also centrally bored to slidably accommodate a piston rod or thrust column. Thus, with this construction cylinder 12 is essentially a sealed body with a piston rod slidably operative through end plate 16.

The sealed body of cylinder 12 is generally divided into a pair of pressure sections or chambers 19 and 21 by an orifice plate 22 so that chamber 19, as will be seen, may be pressurized to a level whereby pressure fluid can flow through a central orifice 23 of plate 22 and initiate operation of various components slidably mounted within pressure section 21. To conveniently accommodate and retain orifice plate 22 in the position illustrated, and yet permit orifice plate 22 to be removed if desired, the cylinder 12 may be constructed in two sections 24 and 25 which are threaded to mate at their inner ends. Plate 22 includes an integral peripheral margin or flange 26, which is disposed between the inner end of cylinder section 24 and a suitable inner shoulder carried by cylinder section 25. This rigidly maintains orifice plate 22 in position. To maintain fluid-tight relationship between plate 22 and cylinder sections 24 and 25, a pair of usual O rings 27 are provided, as illustrated.

It is to be noted that the shape and size of orifice 23 of plate 22 is made such that maximum efficiency and minimum pressure drop consonant with the conditions of operation are achieved, as will be apparent to one skilled in the art. The optimum shape is obtainable from technical literature on the subject of pressure orifices, while the diameter of the orifice is dependent upon the pressure and forces desired to be produced by actuator 11, as will be seen.

Pressure chamber 19 is pressurizable through a suitable fluid passageway 28 which may be provided in plate 15, the pressure fluid being drawn from any suitable source (not shown). Compressed nitrogen or air is a satisfactory fluid for pressurizing chamber 19 to a pressure ($P_1$), although it is contemplated that various compressible fluids could be used if desired. The upper portion of cylinder section 21 is similarly pressurizable through a fluid passageway 29 such as that provided in end plate 16, the pressure in chamber 21 being sometimes referred to herein as the "set pressure" ($P_2$) or bias force.

Above orifice plate 22 is located a load piston 31 which is carried within cylinder 12 and is adapted for longitudinal slidable movement therein. Piston 31 is free floating whereby its movement is independent of the movement of the other components of actuator 11. Fluid tight sliding cooperation between piston 31 and cylinder 12 is afforded by the provision of an O ring 32 in a peripheral groove of piston 31, and a pair of annular wearing elements 33, made of a suitable wear-resistant material such as Micarta or the like, are disposed within similar grooves of piston 31, as illustrated, to promote a freely slidable relationship between piston 31 and cylinder 12 without danger of scoring either.

Piston 31 is thus freely slidable within cylinder 12, and in its static or quiescent condition rests upon orifice plate 22. Piston 31 may include an integral central metering portion 34 which is adapted to extend downwardly through orifice 23 of plate 22 at this time, and a sealing means or seal member 35 is securely mounted in the lower face of piston 31 and surrounds the orifice 23. Seal 35, which is circularly arranged about the orifice 23, is adapted to be pressed against plate 22 to effect a positive seal therewith during the static or quiescent condition of piston 31 against plate 22. During this sealing disposition of seal member 35, any pressure existing within chamber 19 is restricted in action to the cross sectional are of piston 31 and portion 34 thereof, as defined by or enclosed within the seal 35. This cross sectional area is sometimes conveniently referred to herein as the seal, first, or initial effective pressure area ($A_1$).

In the static position of piston 31 prior to operation or triggering of actuator 11, that is, prior to upward movement of piston 31 under the influence of pressure in chamber 19, the force of the pressurized fluid acting against the seal area is opposed by the force of fluid pressure acting against the effective pressure area ($A_2$) of the upper side of piston 31. This latter pressure is that which exists within the upper chamber 21 of cylinder 12, and it is established first in the operation of actuator 11 in order to compress the resilient seal 35 about the periphery of orifice 23 before developing pressure in chamber 19.

By reason of the difference in area between the seal area $A_1$ and the greater area $A_2$, it will be apparent that very high unit pressures can be developed within chamber 19, as compared to the unit pressures existing within chamber 21, before piston 31 is moved upwardly. This characteristic is utilized in the operation of actuator 11 much in the same manenr as taught in my copending application Serial No. 617,014, filed October 19, 1956, in the name of Jack B. Ottestad, and reference is made to that application for an exhaustive discussion of this phenomenon. Thus, a certain pressure $P_2$ is first established within chamber 21, forcing piston 31 downwardly and bringing seal 35 into sealing relationship with orifice plate 22. Next a pressure $P_1$ is developed against seal area $A_1$ by pressurizing chamber 19, until it over balances the force developed by pressure $P_2$ acting over area $A_2$. This overbalance unseats seal 35, and the much higher pressure $P_1$ then acts over the larger effective pressure area of the underface of piston 31. Since $P_1$ acting over this latter area develops a force much greater than $P_2$, $A_2$, piston 31 will be driven upwardly at a high rate of acceleration. In effect, there occurs an internal amplification of pressure forces by reason of the very rapid exposure of the larger underface area of piston 31 caused by the unseating of seal 35 and the exposure of this larger area to pressure $P_1$.

During the initial travel of piston 31 upwardly after triggering, metering portion 34 of piston 31 serves to establish the quantity of fluid which may pass through orifice 23 whereby the terminal velocity of piston 31 may be controlled. It will be apparent that portion 34 may be shaped, as desired, to either permit a greater, lesser, linear or non-linear flow of fluid through orifice 23, according to the dictates of the particular application for actuator 11. It should be understood that metering portion 34 is not an absolutely essential element in the operation of the present invention as will be apparent from the description of operation hereinafter described.

At this point, if we assume that piston 31 were rigidly coupled to an external load applying element, which it is not, it will be apparent that upward travel of piston 31 could not readily be had if the load applying element were in contact with a comparatively unyieldable workpiece or test specimen. That is, if the test specimen did not permit movement of the load applying element, and consequently did not permit movement of piston 31, it will be apparent that seal 35 could not be unseated and triggering of piston 31 could not occur. However, as previously discussed above, it is often a requirement that loads be applied to a specimen which is relatively unyieldable, as for example, a specimen to be compression tested. For this reason piston 31 is not mechanically coupled to the thrust or load applying element of actuator 11, hereinafter to be described, but instead is operative upon a second or upper piston 36, which is rigidly or mechanically coupled to such load applying element. It will be noted that thrust piston 31 is operative upon piston 36 only through a fluid medium during the greater portion of the upward travel of piston 31.

Piston 36 is longitudinally slidable within cylinder 12, and is located in spaced relation above piston 31 during the static or quiescent condition of piston 31. The space between pistons 31 and 36 is filled with fluid, preferably a hydraulic fluid such as aircraft hydraulic fluid (MIL-S-5606) whereby upward movement of piston 31 tends to cause an upward force on piston 36. Upward movement of piston 36 is not necessarily in exact correspondence with the upward movement of piston 31. Movement of piston 36 relative to piston 31 is dependent upon the downward force applied thereto and the escape of hydraulic fluid at a predetermined rate through a plurality of passageways 37 provided within and through piston 36.

Passageways 37, Figure 2, are uniformly spaced about the longitudinal axis of piston 36 and are open to the upper face of piston 36. From the upper face of piston 36 the passageways 37 converge downwardly to a common central bore or passageway 38 provided in piston 36 and opening to the lower face thereof. The internal diameter of passageway 38 is such that it is adapted to closely accommodate a metering pin portion 39 of piston 22 when the two pistons 36 and 31 are urged together.

Fluid tight relation between the walls of passageway 38 and the base of metering pin 39 is provided by a usual O ring 41 carried in a peripheral groove of pin 39. It will be apparent that, since the space between pistons 36 and 31 is filled with hydraulic fluid, piston 31 when actuated upwardly will cause the fluid to be driven upwardly through passageways 38 and 37. The flow of fluid therethrough will be at a maximum initially when actuator 11 is triggered, and will then be progressively reduced as the metering pin 39 enters and thereby restricts the throat of passageway 38. Depending upon the shape of pin 39, the fluid flow may be regulated as desired, either in a linear or a non-linear manner. Thus, as piston 31 approaches piston 36, the area of flow for the fluid being displaced is being decreased by the metering pin 39, and this results in an increasing back pressure reacting against the underface of piston 36. As pin 39 enters passageway 38 of piston 36, the O ring or seal 41 will eventually seat against the walls of passageway 38 and prevent further fluid displacement therethrough. At this time piston 36 is under the full influence of the gas pressure acting at the underface of piston 31. It will therefore be apparent that the output of actuator 11, that is the force upon piston 36, as will be seen, is dependent only upon the relative positions of pistons 36 and 31 and not upon the absolute position or movement of piston 36 with respect to the cylinder 12.

The wave form of the force versus time pattern produced may be considered in two phases, the upward movement of piston 36 being the first phase or build-up at maximum dynamic load. The second phase is the force decay back to zero, and this may conveniently be accomplished by venting the volume of that portion of chamber 21 which is defined between the underface of piston 31 and the upper face of orifice plate 22. Such venting may be had through the use of a constant bleed orifice 42 provided in the wall of cylinder 12 just above orifice plate 22, or through the use of a usual pressure bleed off check valve (not shown) which may be located in the same place as orifice 42.

Fluid tight cooperation between piston 36 and cylinder 12 is afforded by the provision of an O ring 43 in a peripheral groove of piston 36, and a wearing element 44 made of a suitable wear-resistant material such as Micarta or the like is disposed within a similar peripheral groove of piston 36, as illustrated, to promote a freely slidable relationship between piston 36 and cylinder 12 without danger of scoring of either.

Piston 36 embodies a piston rod portion or thrust column 45 which serves to transmit the thrust of piston 36, thereby acting as an element for applying a load to a test coupon, a workpiece or the like (not shown). As illustrated, column 45 forms an upward extension of piston 36 and projects above end plate 16 through a suitable central opening therein.

Column 45 is slidably operative through end plate 16, and an O ring 46 is carried by plate 16 to provide fluid-tight cooperation between plate 16 and column 45. In addition, a wearing element 47 is carried by plate 16 to afford a freely-sliding arrangement, and a retaining plate or ring 48 serves to maintain element 47 in position.

The upper end of column 45 is threaded to accept a stop element 49 which is adjustable along the length of the upper end of column 45 to establish the maximum downward travel of piston 36. Column 45 is also provided at its upper end with a transverse tapped opening 51, which is normally capped, this opening 51 communicating with a central bore 52 provided in column 45. Bore 52 in turn communicates with an orifice 53 at the base of column 45, as illustrated, whereby opening 51 may be uncapped for the introduction of hydraulic fluid to fill passageway 38 and also that portion of chamber 21 below passageway 38 and above piston 31. A pair of grooves 54 are cut into the upper face of piston 36 to provide fluid communication between orifice 53 and passageways 37 whereby the fluid may pass without obstruction from bore 52 to passageway 38. Opening 51 is, of course, again capped after the supply of hydraulic fluid has been replenished.

It will be apparent that if actuator 11 were disposed with its longitudinal axis horizontal, the hydraulic fluid therein would undesirably pass, in part, into the upper portion of chamber 21. Since it is contemplated that actuator 11 may be disposed at any angle during operation, a retaining piston 55 is slidably mounted within cylinder 21, and is positioned to normally rest against the upper surface of piston 36. It will be apparent that piston 55 blocks the undesired escape of fluid, and yet it is desirably responsive to and does not interfere with movement of piston 36. To insure fluid-tight relation between cylinder 12 and column 45, which is slidably disposed through piston 55, a pair of usual O rings 56 and 57, respectively, are provided as illustrated.

For a summary of the operation of actuator 11, reference is made to Figures 3 through 6, wherein Figure 3 illustrates the static or quiescent condition of the components of actuator 11. At this time chamber 21 has been pressurized to the "set" pressure $P_2$, and there is consequently a downward thrust of $P_2A_2$ acting against load piston 31, this pressure being transmitted, of course, through retaining piston 55 and thence through the fluid between pistons 55 and 31. This pressure $P_2A_2$ serves to seat seal 35 against orifice plate 22, compressing the resilient seal 35 about the periphery of orifice 23. Next, a pressure $P_1$ is applied to chamber 19, resulting in an upward thrust of $P_1A_1$ against piston 31, and since the area $A_2$ is much larger than the area $A_1$ it will be apparent that pressure $P_1$ can be raised to a high value before a balanced thrust condition exists. This pressure $P_1$ is increased until an overbalance of thrust in the upward direction occurs, and an unseating of seal 35 will occur. With the seal broken, the actuator 11 is triggered upwardly since the pressure in chamber 19 is no longer restricted to the small surface $A_1$ defined by seal 35, but rather reacts over the entire undersurface of load piston 31, thereby producing a very large unbalanced thrust against piston 31. The large net thrust upward causes piston 31 to accelerate rapidly upward, Figure 4. It will be apparent that the actuator 11 provides a load amplification adapted to effect almost instantaneous generation of large upward thrust values for piston 31.

The pressure acting against piston 31 is dependent upon the flow area of orifice 23 and hence, by regulating this area with metering pin portion 34, a predetermined variable force on piston 31 may be produced. As will be apparent, the cross-sectional area of pin portion 34 along its longitudinal axis, and its relative position with respect to orifice 23, produces the desired regulation of flow area.

The upward travel of piston 31 causes a displacement of hydraulic fluid through the passageways 37 and 38, and it will be seen that depending upon the downward force applied to piston 36 movement of piston 36 may also occur since the displacement of fluid cannot occur instantaneously and movement of piston 36 affords the necessary displacement.

As piston 31 approaches piston 36 the area of flow for the displaced fluid is decreased until it is completely stopped by the seating of seal 41 of piston 31 within passageway 38 of piston 36, Figure 5. Constant bleed orifice 42 has been comparatively insignificant in effect up to this point since the quantity of fluid displaced upwardly is so great, but after maximum dynamic loading of piston 36, by reason of the contact therewith by piston 31, the action of orifice 42 is felt. Pressure is reduced against the underface of piston 31, and there is a corresponding decay of force to the point where the weight of the components brings them to the positions illustrated in Figure 6. To position the components for another cycle of operation, chamber 21 is pressurized, and the components assume the positions shown in Figure 3.

Figure 7 illustrates another embodiment of the present invention, this embodiment being generally designated 58. Actuator 58 is particularly adapted for double-ended operation, rather than the single-ended operation of actuator 11. It will be remembered that thrust column 45 of actuator 11 was operative only through the upper end of the unit. However, actuator 58 is operative not only through its upper end, here its left end, but also through its right end whereby an improved convenience is provided in performing, for example, tension and compression tests upon test coupons, the tension tests being performed at one end and the compression tests at the other. In all other respects actuators 11 and 58 are substantially the same, and for this reason the description of detail parts of actuator 58 will be omitted.

Actuator 58, like actuator 11, includes a cylinder 59 which is threaded at its ends to accept end caps 61 and 62 for the securement of end plates 63 and 64, respectively. It is noted that both end plates 63 and 64 carry packing elements and O rings in the manner of the end plate 16 of actuator 11 since both plates 63 and 64 slidably accommodate a thrust column, as will be seen.

An orifice plate 65 is integrally carried by cylinder 59, and a load piston 66 rests in sealed position against plate 65 during the static state of actuator 58 prior to triggering. As described hereinbefore piston 66 may carry a metering pin portion 67 provided with a central bore 68 which extends to the left completely through the length of piston 66 whereby piston 66 may be slidably mounted upon a thrust column 69. Thus, piston 66 is free floating along the column 69, which in turn extends and is slidably operative through end plate 64.

At its left side, piston 66 embodies a tapered metering pin 71 which is adapted to slide over column 69 and into a passageway 72 of an integral side portion 73 of a central piston 74, thereby metering the flow of hydraulic fluid through passageway 72 and a plurality of passageways 75 which are bored through piston 74 and provide fluid communication between passageway 72 and the left face of piston 74. Like the provision of a retaining piston 55 for actuator 11, a retaining piston 76 is provided in actuator 58 to prevent the uncontrolled flow of fluid driven through the passageways 75 where the actuator is operated in the horizontal position.

The left end of thrust column 69 is threadably secured within piston 74, and extends to the right through passageway 72, with metering pin 71 being accommodatable within the annular space formed between passageway 72 and column 69 to regulate the flow of fluid therethrough.

Piston 76 is slidable over a thrust column 77 which at its right end is threadably secured to piston 74, and which at its left end is slidably disposed through end plate 63. Piston 76 is operative in a chamber 78 formed between plate 63 and piston 74, and upon pressurization of chamber 78 to "set" pressure, will be driven to the right toward piston 74. The set pressure $P_1$ is opposed by a pressure $P_2$ which is developed in a chamber 79 formed between orifice plate 65 and end plate 64, as will be apparent when reference is made to the similar operation of actuator 11. However, different from the operation of actuator 11, the piston 74 not only effects movement of thrust column 77 under the influence of movement of piston 66, but also effects movement of the thrust column 69. This permits use, for example, of an end 81 of column 77 for compression tests, and also an end 82 of column 69 for tensile tests, as will be evident to those skilled in the art. As column 77 experiences a thrust movement upon a triggering of actuator 58 (in the manner of actuator 11) so too will column 69 experience a thrust movement by reason of its securement to piston 74.

Thus, an actuator has been described which is capable of producing a predetermined force-time pattern and which produces this pattern independently of the absolute position of the thrust column.

While certain preferred embodiments of the invention have been specifically disclosed it is understood that the invention is not limited thereto as many variations will be readily apparent to those skilled in the art and the invention is to be given its broadest possible interpretation within the terms of the following claims:

1. An actuator comprising a cylinder having orifice defining means therein, a movable first piston member positioned within said cylinder and having an undersurface facing said orifice defining means, said piston member being adapted upon the application of a force thereagainst to cover said orifice whereby a portion of said undersurface is exposed thereto, means for effecting a pressure seal between said orifice defining means and said piston member, means for applying fluid pressure to the exposed portion of said undersurface to overbalance said force and allow the fluid pressure to act over an increased area of said undersurface, a second piston member spaced from said first piston member and positioned within said cylinder on the same side of said orifice defining means as said first piston member, and a thrust element secured to said second piston member and arranged to transmit movement of said second piston member.

2. An actuator comprising a cylinder having orifice defining means therein, a movable first piston member positioned within said cylinder and having an undersurface facing said orifice defining means, said piston member being adapted upon the application of a force thereagainst to cover said orifice whereby a portion of said undersurface is exposed thereto, means for effecting a pressure seal between said orifice defining means and said piston member, means for applying fluid pressure to the exposed portion of said undersurface to overbalance said force and allow the fluid pressure to act over an increased area of said undersurface, a second piston member spaced from said first piston member and positioned within said cylinder on the same side of said orifice defining means as said first piston member, a liquid filling the space between said first piston member and said second piston member, a thrust element secured to said second piston member and arranged to transmit movement thereof, and means for controlling the displacement of said liquid to thereby adjust the fluid back pressure tending to move said second piston member in response to movement of said first piston member.

3. An actuator comprising a cylinder carrying a fixed plate with an orifice therein, a first piston member positioned within said cylinder and having an undersurface facing said plate and arranged to cover said orifice, a resilient pressure seal surrounding said orifice and disposed between said piston undersurface and said plate, means for applying a force on said piston to establish said piston undersurface in sealing relationship with said plate and exposing a portion of said undersurface to said orifice, a source of pressure acting over the exposed portion of said undersurface to overbalance said force to allow said pressure to act over an increased area of said undersurface, a second piston member having passageways therein and spaced from said first piston member, said second piston member being positioned within said cylinder on the same side of said plate as said first piston member, hydraulic fluid filling the space between said first piston member and said second piston member, and a thrust column secured to said second piston member and arranged to transmit movement thereof, said passageways in said second piston member serving to regulate fluid displacement therethrough whereby the tendency of said second piston member to move in response to fluid displacing movement of said first piston member is controlled.

4. An actuator comprising a cylinder having an orifice member mounted therein defining first and second chambers, a first piston slidable within said first chamber, means for applying a force to said first piston to close the orifice of said orifice plate, means interposed between said first piston and said orifice member to provide a pressure seal therebetween, means for admitting pneumatic pressure to said second chamber and through said orifice to exert a force against said first piston to move it out of sealed relationship with said orifice member, a second piston slidable within said first chamber and spaced from said first piston, and hydraulic fluid filling the space therebetween, said second piston embodying fluid metering passages therethrough, said first piston embodying a metering pin portion adapted to cooperate with said fluid metering passages to control the flow of said hydraulic fluid displaced by said movement of said first piston whereby the fluid back pressure against said second piston in response to movement of said first piston is controlled to afford a predetermined force-time effect upon said second piston, and a thrust element secured to said second piston and arranged to transmit movement of said second piston.

5. An actuator comprising a cylinder having an orifice member mounted therein defining first and second chambers, a first piston slidable within said first chamber, means for applying a force to said first piston to close the orifice of said orifice plate, means interposed between said first piston and said orifice member to provide a pressure seal therebetween, means for admitting pneumatic pressure to said second chamber and through said orifice to exert a force against said first piston to move it out of sealed relationship with said orifice member, a metering pin member carried by said first piston for regulating the flow of pneumatic fluid through said orifice to provide predetermined forces upon said first piston during movement thereof away from said orifice member, a second piston slidable within said first chamber and spaced from said first piston, and hydraulic fluid filling the space therebetween, said second piston embodying fluid metering passages therethrough, said first piston embodying a metering pin portion adapted to cooperate with said fluid metering passages to control the flow of said hydraulic fluid displaced by said movement of said first piston whereby the fluid back pressure against said second piston in response to movement of said first piston is controlled to afford a predetermined force-time effect upon said second piston, and a thrust element secured to said second piston and arranged to transmit movement of said second piston.

6. An actuator comprising a pressure vessel embodying an orifice member, a first piston movable within said pressure vessel, a second piston movable within said pressure vessel and spaced from said first piston, said first and second pistons being disposed on the same side of said orifice member, hydraulic fluid disposed within the space between said first piston and said second piston, force transmitting means connected to said second piston, said first piston being movable in a first direction to cover the orifice of said orifice member and movable in a second direction to tend to displace said hydraulic fluid, bias means for forcing said first piston in said first direction, means defining between said orifice member and said first piston a lesser effective pressure area than the total effective pressure area of said first piston, and means for applying pressure fluid to said lesser effective pressure area of said first piston to overbalance the bias force thereagainst and allow pressure fluid to pass through said orifice to effect movement of said first piston in said second direction, said second piston embodying fluid passages therethrough to regulate the rate of flow of hydraulic fluid displaced by movement of said first piston in said second direction whereby the fluid back pressure against said second piston is controlled to afford a predetermined force-time effect upon said second piston.

7. An actuator comprising a pressure vessel embodying an orifice member, a first piston movable within said pressure vessel, a second piston movable within said pressure vessel and space from said first piston, said first and second pistons being disposed on the same side of said orifice member, hydraulic fluid disposed within the space between said first piston and said second piston, force transmitting means connected to said second piston, said first piston being movable in a first direction to cover the orifice of said orifice member and movable in a second direction to tend to displace said hydraulic fluid, bias means for forcing said first piston in said first direction, means defining between said orifice member and said first piston a lesser effective pressure area than the total effective pressure area of said first piston, means for applying pressure fluid to said lesser effective pressure area of said first piston to overbalance the bias force thereagainst and allow pressure fluid to pass through said orifice to effect movement of said first piston in said second direction, said second piston embodying fluid passages therethrough to regulate the rate of flow of hydraulic fluid displaced by movement of said first piston in said second direction whereby the fluid back pressure against said second piston in response to movement of said first piston is controlled to afford a predetermined force-time characteristic, and fluid restraining means movable within said pressure vessel and located to confine against said second piston the hydraulic fluid flowing out of said fluid passages.

8. An actuator comprising a cylinder embodying an orifice member, a first piston movable within said cylinder, a second piston movable within said cylinder and spaced from said first piston, said first and second pistons being disposed on the same side of said orifice member, hydraulic fluid disposed within the space between said first piston and said second piston, a thrust column connected to said second piston and extending out of both ends of said cylinder, said first piston being centrally bored to slide over said thrust column and movable in a first direction to cover the orifice of said orifice member and movable on a second direction to tend to displace said hydraulic fluid, bias means for forcing said first piston in said first direction, means defining between said orifice member and said first piston a lesser effective pressure area than the total effective pressure area of said first piston, and means for applying pressure fluid to said lesser effective pressure area of said first piston to overbalance the bias force thereagainst and allow pressure fluid to pass through said orifice to effect movement of said first piston in said second direction, said second piston emobdying fluid passages therethrough to regulate the rate of flow of hydraulic fluid displaced by movement of said first piston in said second direction whereby the movement of said thrust column in response to movement of said first piston is controlled by the fluid back pressure reacting against said second piston thereby to produce a predetermined force-time characteristic at both ends of said thrust column.

9. An actuator comprising a cylinder embodying an orifice member, a first piston and a second piston movably disposed within said cylinder, said first and second pistons being spaced apart and disposed on the same side of said orifice member, hydraulic fluid in the space between said first and second pistons, said first piston embodying a metering pin portion, said second piston embodying at least one metering passage therethrough, said metering pin portion being adapted to cooperate with said metering passage to regulate the rate of flow of hydraulic fluid therethrough, bias means for applying a pressure against said second piston and consequently, through said hydraulic fluid, against said first piston to force said first piston in a first direction to cover the orifice of said orifice member, means defining between said orifice member and said first piston a lesser effective pressure area than the total effective pressure area of said first piston, means for admitting fluid pressure through said orifice and against said first piston in an amount sufficient to overbalance the force of said bias means, thereby disengaging said first piston member from said orifice member and exposing the total effective pressure area of said first piston to fluid pressure whereby said first piston tends to be rapidly displaced, and a thrust column connected to said second piston for transmitting the force established by fluid back pressure reacting against said second piston.

10. An actuator comprising a cylinder embodying an orifice member, a first piston and a second piston movably disposed within said cylinder, said first and second pistons being spaced apart and disposed on the same side of said orifice member, hydraulic fluid in the space between said first and second pistons, said first piston embodying first and second metering pin portions, said first metering pin portion being operative into and out of the orifice of said orifice member, said second piston embodying at least one metering passage therethrough, said second metering pin portion being adapted to cooperate with said metering passage to regulate the rate of flow of hydraulic fluid therethrough, bias means for applying a pressure against said second piston and consequently, through said hydraulic fluid, against said first piston to force said first piston in a first direction to cover the orifice of said orifice member, means defining between said orifice member and said first piston a lesser effective pressure area than the total effective pressure area of said first piston, means for admitting fluid pressure through said lesser effective pressure area of said orifice and against said first piston in an amount sufficient to overbalance the force of said bias means, thereby disengaging said first piston member from said orifice member and exposing the total effective pressure area of said first piston to fluid pressure whereby said first piston tends to be rapidly displaced, and a thrust column connected to said second piston for transmitting the force established by fluid back pressure reacting against said second piston.

11. An actuator comprising a cylinder embodying an orifice member, a first piston and a second piston movably disposed within said cylinder, said first and second pistons being spaced apart and disposed on the same side of said orifice member, hydraulic fluid in the space between said first and second pistons, said first piston embodying a metering pin portion, said second piston embodying at least one metering passage therethrough, said metering pin portion being adapted to cooperate with said metering passage to regulate the rate of flow of hydraulic fluid therethrough, bias means for applying a pressure against said second piston and consequently, through said hydraulic fluid, against said first piston to force said first piston in a first direction to cover the orifice of said orifice member, a resilient sealing element carried by said first piston and adapted to register with said orifice member to define a lesser effective pressure area than the total effective pressure area of said first piston, means for admitting fluid pressure through said orifice and against said lesser effective pressure area of said first piston in an amount sufficient to overbalance the force of said bias means, thereby disengaging said first piston member from said orifice member and exposing the total effective pressure area of said first piston to fluid pressure whereby said first piston tends to be rapidly displaced, and a thrust column connected to said second piston for transmitting the force established by fluid back pressure reacting against said second piston.

12. An actuator comprising a cylinder embodying an orifice member, a first piston and a second piston movably disposed within said cylinder, said first and second pistons being spaced apart and disposed on the same side of said orifice member, hydraulic fluid in the space between said first and second pistons, metering means adapted to regulate the displacement of said hydraulic fluid when said first piston is moved toward said second piston whereby the force upon said second piston established by fluid back pressure thereagainst is regulated, bias means for applying a pressure against said second piston and consequently, through said hydraulic fluid, against said first piston to force said first piston in a first direction to cover the orifice of said orifice member, means defining between said orifice member and said first piston a lesser effective pressure area than the total effective pressure area of said first piston, means for admitting fluid pressure through said orifice and against said first piston in an amount sufficient to overbalance the force of said bias means, thereby disengaging said first piston member from said orifice member and exposing the total effective pressure area of said first piston to fluid pressure whereby said first piston tends to be rapidly displaced, and a thrust column connected to said second piston for transmitting the force established by fluid back pressure reacting against said second piston.

13. An actuator comprising a cylinder embodying an orifice member, a first piston and a second piston movably disposed within said cylinder, said first and second pistons being spaced apart and disposed on the same side of said orifice member, hydraulic fluid in the space between said first and second pistons, said first piston embodying first and second metering pin portions, said first metering pin portion being operative into and out of the orifice of said orifice member, said second piston embodying at least one metering passage therethrough, said second metering pin portion being adapted to cooperate with said metering passage to regulate the rate of flow of hydraulic fluid therethrough, bias means for applying a pressure against said second piston and consequently, through said hydraulic fluid, against said first piston to force said first piston in a first direction to cover the orifice of said orifice member, means defining between said orifice member and said first piston a lesser effective pressure area than the total effective pressure area of said first piston, means for admitting fluid pressure through said orifice and against said lesser effective pressure area of said first piston in an amount sufficient to overbalance the force of said bias means, thereby disengaging said first piston member from said orifice member and exposing the total effective pressure area of said first piston to fluid pressure whereby said first piston tends to be rapidly displaced, a thrust column connected to said second piston for transmitting the force established by fluid back pressure reacting against said second piston, said thrust column embodying a central bore opening at one end to said metering passage whereby said hydraulic fluid may be introduced in the space between said first piston and said second piston, and fluid pressure bleed means for venting the pressure acting through said orifice and against said first piston.

14. An actuator comprising a cylinder embodying an orifice member, a thrust column disposed through and extending from the ends of said cylinder, a first piston movably disposed within said cylinder and slidably movable relative to said thrust column, a second piston movably disposed within said cylinder and fixed to said thrust column for movement therewith, said first and second pistons being spaced apart and disposed on the same side of said orifice member, hydraulic fluid in the space between said first and second pistons, metering means adapted to regulate the displacement of said hydraulic fluid when said first piston is moved toward said second piston whereby the force upon said second piston established by fluid back pressure thereagainst is regulated, bias means for applying a pressure against said second piston and consequently, through said hydraulic fluid, against said first piston to force said first piston in a first direction to cover the orifice of said orifice member, means defining between said orifice member and said first piston a lesser effective pressure area than the total effective pressure area of said first piston, and means for admitting fluid pressure through said orifice and against said first piston in an amount sufficient to overbalance the force of said bias means, thereby disengaging said first piston member from said orifice member and exposing the total effective pressure area of said first piston to fluid pressure whereby said first piston tends to be rapidly displaced, said thrust column serving to transmit to its ends the force established by fluid back pressure reacting against said second piston.

References Cited in the file of this patent
UNITED STATES PATENTS

| | | |
|---|---|---|
| 1,799,366 | Heinkel | Apr. 7, 1931 |
| 2,452,292 | Cousino | Oct. 26, 1948 |
| 2,474,235 | Dresser et al. | June 28, 1949 |
| 2,719,510 | Elder | Oct. 4, 1955 |
| 2,810,288 | Herron et al. | Oct. 22, 1957 |

OTHER REFERENCES

Publication: The Hyge Shock Tester, pages 1–5, Consolidated Electro. Corp. Rochester Division, February 1957, Bulletin 4–70.